(12) United States Patent
Acharya et al.

(10) Patent No.: US 6,523,348 B1
(45) Date of Patent: Feb. 25, 2003

(54) WORK RECOVERY FROM PROCESS INVOLVING STEAM GENERATION

(75) Inventors: Arun Acharya, East Amherst, NY (US); Christian Friedrich Gottzmann, Clarence, NY (US); Bayram Arman, Grand Island, NY (US); Dante Patrick Bonaquist, Grand Island, NY (US); John Henri Royal, Grand Island, NY (US)

(73) Assignee: Praxair Technology, Inc., Danbury, CT (US)

(*) Notice: Subject to any disclaimer, the term of this patent is extended or adjusted under 35 U.S.C. 154(b) by 0 days.

(21) Appl. No.: 09/846,361

(22) Filed: May 2, 2001

(51) Int. Cl.⁷ .............................................. F01K 25/08
(52) U.S. Cl. ................................... 60/651; 60/671
(58) Field of Search ..................... 60/651, 670, 671

(56) References Cited

U.S. PATENT DOCUMENTS

| | | | |
|---|---|---|---|
| 3,237,421 A | 3/1966 | Gifford | 62/88 |
| 4,559,551 A | 12/1985 | Nakagawa | 357/38 |
| 4,953,366 A | 9/1990 | Swift et al. | 62/467 |
| 5,515,684 A * | 5/1996 | Lucas et al. | 62/6 |
| 5,516,359 A | 5/1996 | Kang et al. | 95/14 |
| 5,753,007 A | 5/1998 | Russek et al. | 95/41 |
| 5,996,345 A | 12/1999 | Hofler | 60/517 |
| 6,007,606 A | 12/1999 | Baksh et al. | 95/98 |
| 6,021,643 A * | 2/2000 | Swift et al. | 62/6 |
| 6,164,073 A * | 12/2000 | Swift et al. | 60/721 |

OTHER PUBLICATIONS

Swift, "Thermoacoustic Engines and Refrigerators", Physics Today, pp 22–28 (1995).

* cited by examiner

Primary Examiner—Hoang Nguyen
(74) Attorney, Agent, or Firm—David M. Rosenblum

(57) ABSTRACT

A method of conducting a process involving the generation of steam in which a hot process stream is generated. The hot process stream can be generated in any manner and can include a burner section of a steam methane reformer, a gas turbine of an integrated combined cycle, a combustion chamber used to pre-heat incoming air and oxygen for a blast furnace, an oxygen transport membrane system, and a gas turbine or natural gas engine that provided to compress air in a cryogenic air separation unit. Heat from the hot process stream is transferred to a thermoacoustic engine to recover work at high temperatures and to generate an intermediate temperature process stream therefrom. The intermediate temperature process stream is introduced to a steam generator to generate the steam.

15 Claims, 7 Drawing Sheets

WORK RECOVERY FROM PROCESS INVOLVING STEAM GENERATION

FIELD OF THE INVENTION

The present invention relates to a method of conducting a process involving the generation of steam in which the steam is raised from a hot process stream that is passed into a steam generator. More particularly, the present invention relates to such a method in which hot process stream is introduced into a thermoacoustic engine to recover work prior to its being introduced into a steam generator.

BACKGROUND OF THE INVENTION

There are a variety of industrial processes in which hot process streams are generated that are used to raise steam. As will be discussed the steam can be used to generate additional energy that is useful for the process or that can be converted to electricity to be reintroduced into a power grid. Moreover, the steam itself may constitute a necessary ingredient of the process.

For instance, heat recovery steam generators, also known as waste-heat boilers, recover energy from process streams produced by such processes as incineration systems, cogeneration systems and chemical process plants. Incineration systems operate at high temperatures, typically between 1650 to 2,4000° F. In such systems, waste heat recovery from process streams formed of heated flue gases can be applied to generate stream that in turn can be used to generate electricity. In cogeneration plants thermal energy contained in a process stream formed from a gas turbine exhaust can also be recovered in the form of steam and electricity. In chemical process plants, steam generators are often used to cool process streams. The steam generated can be used to recover energy or can itself be used in the process being conducted.

A concrete example of a chemical process involving steam generation can be found in steam-reforming operations in which product streams from the reformer and shift converter are cooled. A mixture of feed gas and steam is fed into a reaction furnace or reformer heated by flue gases. The product stream is cooled before being sent to a reactor where an exothermic shift conversion reaction takes place. The product stream from the shift conversion also needs to be cooled. As may be appreciated, during the cooling stages, steam may be raised to recover energy and to serve as a reactant.

The foregoing involve just a few exemplars of many processes that generate high temperature process streams in which energy can be recovered by steam generators. In any process in which energy is to be recovered at high temperature through steam generation, thermodynamic inefficiencies can arise from the rejection of heat from the cold end of steam generators of practical size and cost.

As will be discussed, the present invention involves the integration of a process in which steam is generated with a thermoacoustic engine. The processes can be of the types described above. In this regard, the operation of thermoacoustic engines is fully described in Physics Today, "Thermoacoustic Engines and Refrigerators", by Gregory W. Swift, pp. 22–27, July 1995. Briefly stated, a thermoacoustic engine is a known device that employs a resonator tube containing hot and cold end heat exchangers thermally linked by a stack of parallel plates to convert thermal energy to acoustic energy. The work of the acoustic energy can be converted to work, electricity, or refrigeration. Examples of devices in which thermoacoustic work is converted to electricity are shown in U.S. Pat. Nos. 5,996,345 and 4,559,551. An example of a device in which thermoacoustic work is used to generate refrigeration is described in U.S. Pat. No. 4,953,366 in which a thermoacoustic engine is used in combination with an orifice pulse tube refrigerator. It has at least been proposed to use the combination of a thermoacoustic engine and orifice pulse tube refrigerator, known as a TADOPTR, in natural gas fields to liquefy natural gas. In such an application, a part of the natural gas to be liquefied is burned to power a TADOPTR that in turn is used to liquefy a remaining part of the natural gas.

In the present invention, a portion of the energy is advantageously recovered from a high temperature process stream within a thermoacoustic engine prior to the generation of steam through indirect heat exchange with an intermediate temperature process stream at a lower temperature. As a result, the overall thermodynamic efficiency of the process and therefore the amount of energy able to be recovered is increased.

SUMMARY OF THE INVENTION,

The present invention relates to a method of conducting a process involving the generation of steam. In accordance with the invention, a hot process stream is generated. Heat is transferred from the hot process stream to a thermoacoustic engine to recover energy from the hot process stream as thermoacoustic work and to generate an intermediate temperature process stream. The intermediate temperature process stream is introduced into a steam generator to generate the steam.

As may be appreciated, from considerations of Carnot cycle efficiency alone, in order to recover the greatest possible energy from a high temperature process stream through steam generation, a quite massive, if not expensive, heat exchanger is required to reject heat from the process at the lowest temperature possible, normally ambient temperature. By recovering energy first in a thermoacoustic engine and then through the steam generator, a more ideal efficiency is approached because energy recovered in two stages, namely, at high temperature, in a thermoacoustic engine, and then at a lower temperature, within the steam generator, through heat exchange with the cooler intermediate process stream. After heat exchange within the steam generator, the intermediate process stream can be discharged at a temperature that is practically lower than that obtainable had the high temperature process stream been directly introduced into the steam generator. In this regard, a synergy is realized because the thermoacoustic engine requires a high temperature for its operation while the steam generator can adequately function at a lower temperature.

Other advantages can be realized by the method of the invention. A hot process stream can be generated by burning a fuel in the presence of an oxidant. In such case, carbon dioxide is generated. The steam generator can cool the intermediate temperature process stream into a cool stream and carbon dioxide produced from the burning of the fuel can be recovered from the cooled stream. The advantage of this is that the carbon dioxide can be sequestered to prevent the formation of greenhouse gases and can later be sold or used for further industrial processes. Preferably, a water stream can be heated in direct heat exchange with the working fluid within the thermoacoustic engine, the cooled stream during the recovery of carbon dioxide and in the steam generator to produce the steam. The work may be recovered by introducing the steam into a steam turbine. A stream of carbon dioxide can be liquefied in an acoustic refrigerator driven by the thermoacoustic engine.

The foregoing advantageous applications can be used in such industrial processes as steam methane reforming. For instance, the steam can be combined with a methane containing feed and subjected to steam methane reforming, thereby to produce a hydrogen containing gas. The hydrogen can be separated from the hydrogen containing gas to produce a hydrogen product stream and the fuel. The hydrogen product stream can be liquefied in an acoustic refrigerator driven by the thermoacoustic engine.

Another potential application is in coal gasification. In such application, further energy may be recovered from the hot process stream within a turbine prior to the heat transfer with the thermoacoustic engine. The steam can then be introduced into a coal gasifier to generate part of the fuel. The further energy can be applied to power an air compressor to produce a compressed air stream that can be used to at least in part form the oxidant. Preferably the coal gasifier produces an untreated fuel stream and part of the compressed air stream forms the oxidant. The untreated fuel stream can be introduced in sequence into a further thermoacoustic engine to produce thermoacoustic work, an exhaust gas cooling unit, a clean up unit to produce the part of the fuel. The further thermoacoustic work can be extracted from the thermoacoustic engine.

The heat can be transferred from the hot process stream to the thermoacoustic engine by a heat transfer fluid heated through indirect heat exchange with the hot process stream produced as a flue gas within a furnace. The furnace can be a blast furnace and the steam can be used to drive a steam turbine thereby to produce shaft work. The shaft work can be applied to two air compressors to compress air. One of the two air compressors is coupled to a vacuum pressure swing adsorption unit to produce an oxygen stream and the other of the two air compressors produces a compressed air stream. The compressed air stream and the oxygen stream are heated within the blast furnace. The compressed air stream and the oxygen stream after having been heated can be introduced into the blast furnace for combustion of coke and thereby to produce a reducing gas.

In a still further application, the oxygen containing gas can be passed into an oxygen transport membrane reactor, thereby to produce a heated retentate stream and an oxygen product stream. The hot process stream is then formed at least in part from the heated retentate stream. The oxygen product stream can be liquefied in an acoustic refrigerator driven by the thermoacoustic engine.

A yet still another application involves cryogenic air separation. A hot process stream can be produced from the exhaust of the gas turbine. Shaft work produced by the gas turbine can be applied to a compressor to compress air in a cryogenic air separation unit. The cryogenic air separation unit produces at least one product stream, predominately composed of nitrogen or oxygen and the at least one product stream can be liquefied within an acoustic refrigerator driven by the thermoacoustic engine. In such an application, the steam can be introduced into a steam turbine to produce further shaft work.

In a further application of the present invention, the fuel and oxidant are burned within a natural gas engine generating shaft work. Part of the shaft work is used to drive an air compressor to compress air in a cryogenic air separation unit. The cryogenic air separation unit produces a product stream enriched in one of oxygen and nitrogen. Such product stream is introduced into a vapor compression refrigerator driven by a further part of the shaft work and then into an acoustic refrigerator driven by the acoustic work produced in the thermoacoustic engine.

BRIEF DESCRIPTION OF THE DRAWINGS

While the specification includes claims distinctly pointing out the subject matter of the application regarding the present invention, it is believed that the invention will be better understood when taken in connection with the accompanying drawings in which:

DETAILED DESCRIPTION

Figure 1:
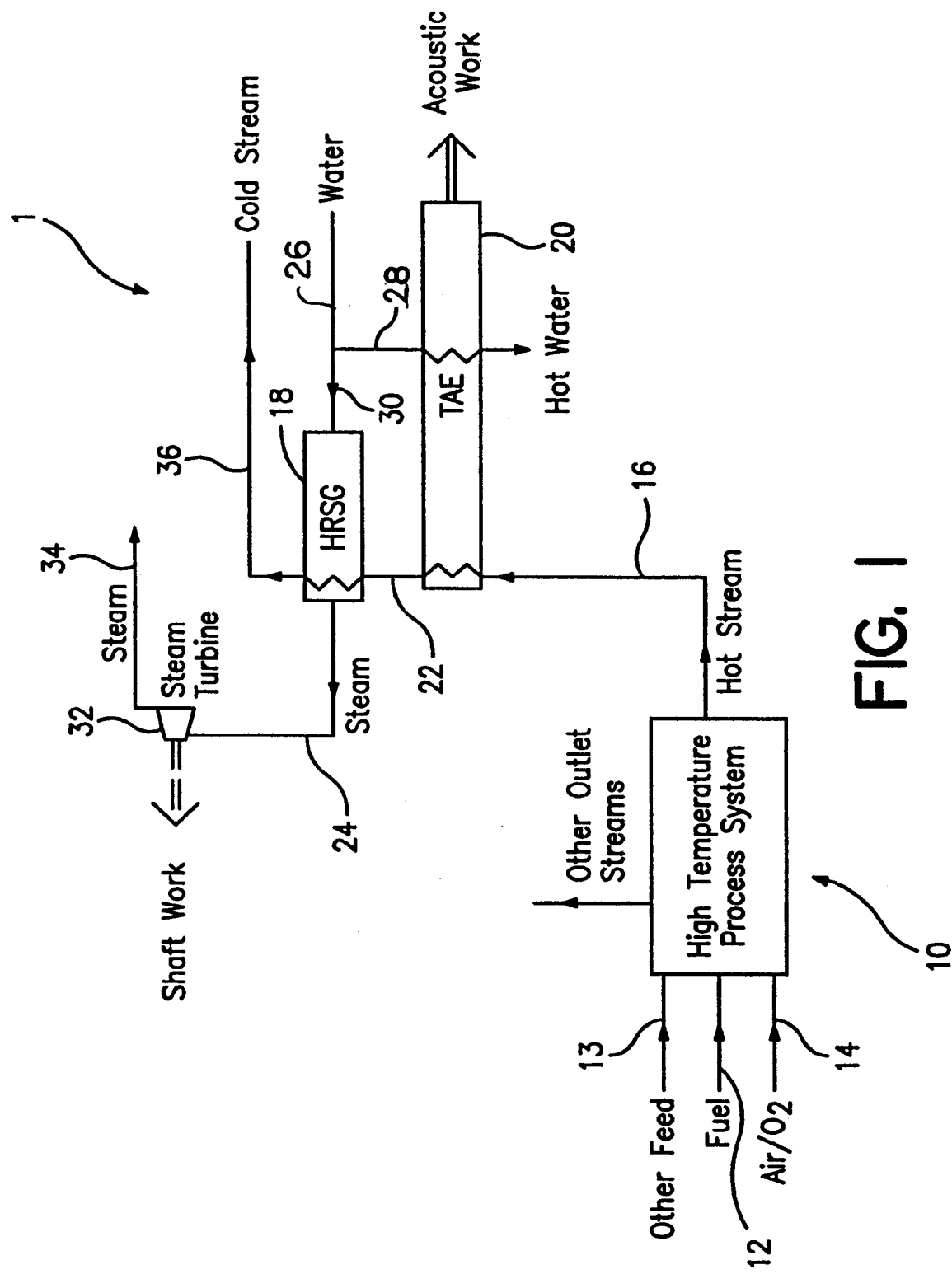
FIG. 1 is a schematic illustration of the present invention generally applied to a high temperature process system for carrying out a method in accordance with the present invention.

With reference to FIG. 1, an apparatus 1 is illustrated. Apparatus 1 generally illustrates a process involving the generation of steam. Such process includes a process system 10 that operates at a high temperature through the combustion of the fuel in the presence of an oxygen-containing gas that is introduced into process system 10 via fuel and air streams 12 and 14, respectively. Depending upon the process, another feed stream 13 might be required.

Process system 10 generates a hot process stream 16. Hot process stream 16 can be a waste stream, product stream or perhaps, an intermediate product stream. Further examples of the process system 10 will be discussed with respect to the successive figures contained herein.

The heating value of hot process 16 is recovered in a steam generator 18 which generates steam that can be used for a variety of purposes. Assuming that hot process stream 16 is at a temperature of anywhere from 600 to 1000° C., it practically becomes impossible to efficiently recover the thermal energy of hot process stream 16 solely within steam generator 18. In accordance with the present invention, in order to recover useful work from hot process stream 16, hot process stream 16 is first introduced into a thermoacoustic engine 20 that can recover energy of hot process stream 16 at high temperature and as acoustic work that can be applied to the generation of electricity, shaft work, and as will be discussed, in refrigeration.

As has been discussed, thermoacoustic engine 20 is a device consisting of a resonator tube containing hot and cold end heat exchangers linked by a stack of parallel plates. A gas, usually helium is located within the resonator tube. When a sufficiently high temperature difference is maintained by the hot and cold end heat exchangers, the gas in the stack produces work because the gas in the stack experiences thermal expansion when the pressure is high and thermal contraction when the pressure is low. The work produced by such expansion and contraction can be used for a variety of purposes. The invention should not, however, be considered as so limited and therefore, as used herein and in the claims, a "thermoacoustic engine" means any device that is specifically designed to convert thermal energy into acoustic energy. In this regard, the present invention would have equal applicability to known toroid-like devices such as thermoacoustic Stirling heat engines or a Vuillerumier engines.

As has been discussed above, one purpose is to drive an acoustic refrigerator such as a pulse tube refrigerator. In a pulse tube refrigerator, a pulse tube communicates with a resonator tube through regenerator material such as steel micro-spheres or screens. An aftercooler in thermal communication with one end of the regenerator material removes the heat of compression. The working fluid within the pulse tube cools down in the regenerator and then expands in the pulse tube to produce refrigeration at a cold end heat exchanger and rejects heat in a warm end heat exchanger. A reservoir in communication with the pulse tube by way of an orifice increases performance by aiding in the control of the phasing of pressure and the flow of pulses. It is to be noted, that the thermoacoustic engine, described above could have applicability to other known acoustic refrigerators such as acoustic Stirling hybrid refrigerators.

The recovery of energy from hot process stream 16 within thermoacoustic engine 20 generates an intermediate temperature process stream 22 which is thereupon fed into steam generator 18 to generate a stream 24 consisting of steam. In this regard, a water stream 26 is divided into subsidiary water streams 28 and 30. Subsidiary water stream 28 is introduced into the cold end heat exchanger contained within thermoacoustic engine 20. Subsidiary water stream 30 is introduced into steam generator 18 to produce stream 24. Stream 24 can be introduced into a steam turbine 32 to generate shaft work that can be applied to a variety of devices, for instance, compressors and electrical generators. The turbine exhaust stream 34, depending upon its temperature and pressure, can be further utilized either in a second stage steam turbine or in other processes. The same holds true for the cooled intermediate process stream 36 that is discharged from the steam generator 18.

Figure 2:
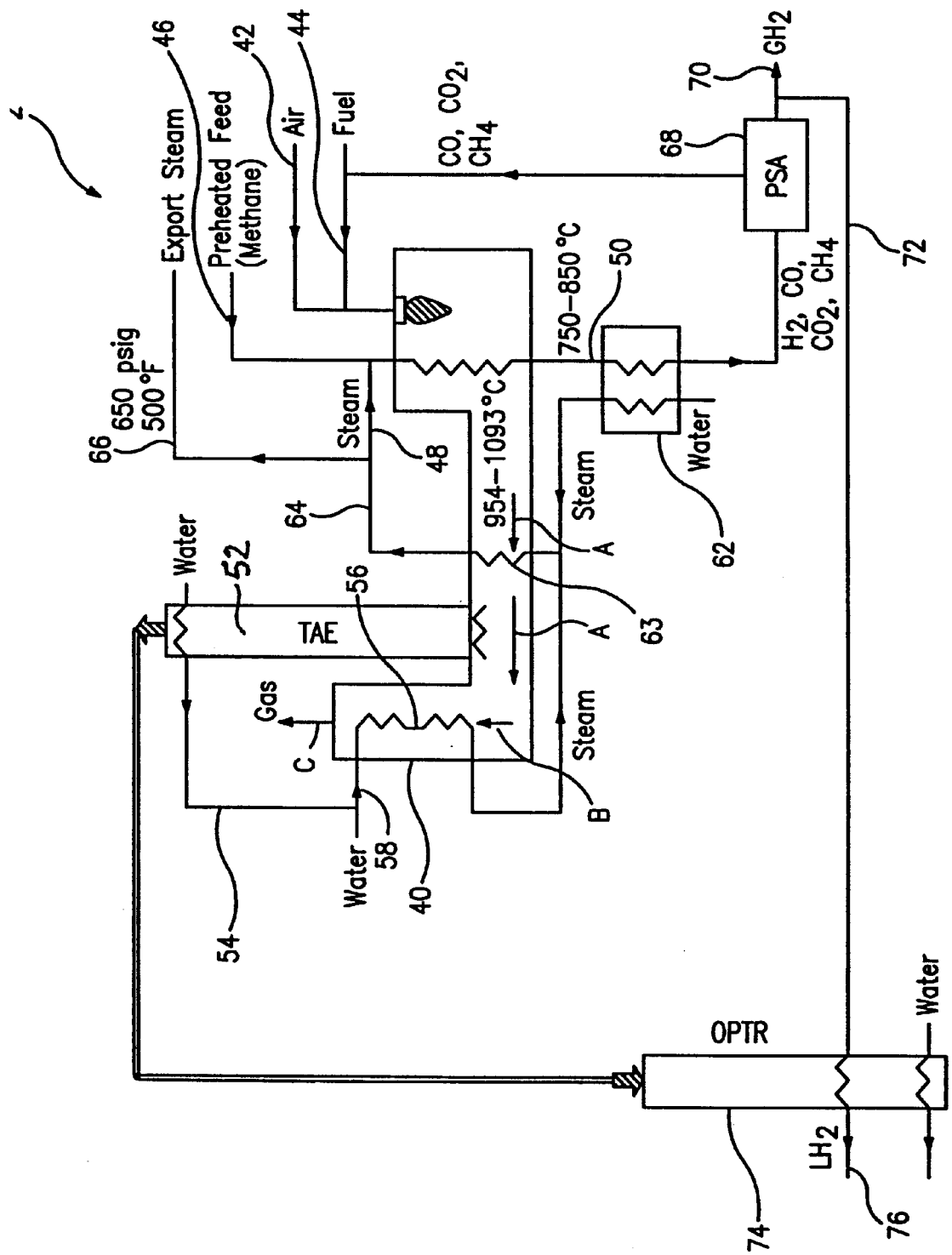
FIG. 2 is a schematic illustration of the steam methane reforming system incorporating a method of the present invention.

With reference to FIG. 2, an apparatus 2 is illustrated that is designed to produce gaseous a hydrogen product through steam methane reforming. In accordance with apparatus 2, a hot process stream is produced in the fom of a flue gas indicated by arrowheads "A". The process system of apparatus 2 is a steam methane reformer 40 into which air and fuel streams 42 and 44, respectively, are introduced. A pre-heated feed stream 46 containing methane and a stream 48 containing steam are introduced into a lnown steam methane reformer 40. In the presence of the catalyst, not shown, the mixture of fuel (methane) and steam produces an intermediate product stream 50 containing hydrogen, carbon monoxide, carbon dioxide and some unreacted methane.

The resultant flue gas stream "A" is brought into indirect heat exchange with the hot-end heat exchanger of a thermoacoustic engine 52 to produce an intermediate temperature flue gas stream labeled as "B". Water is introduced into the cold end heat exchanger located within thermoacoustic engine 52 as a water stream 54. An additional water stream 58 may be combined with water stream 54 to raise steam within a heat exchanger 56 situated within the stack of steam methane reformer 40. The stack gas is discharged as a stream indicated by arrowhead "C". The combined stream (54,58), after having been vaporized to steam can then be combined with a further stream 60 (also steam) produced within steam generator 62 that acts to recover heat within intermediate product stream 50. A heat exchanger 63 contained within steam methane reformer 40 superheats the combined stream, formed of 58 and 60, into a stream 64 containing superheated steam. Stream 64 can be divided into an export stream 66 that can be used in additional processes and stream 48.

Intermediate product stream 50 is introduced into a known PSA separation unit 68, such as described in U.S. Pat. No. 6,007,606, to produce part of the fuel stream 44 and gaseous hydrogen which can be taken as a gaseous hydrogen product stream 70 and a product stream 72 that is liquefied within an acoustic refrigerator such as pulse tube refrigerator 74 to produce a liquid product stream 76. Orifice pulse tube refrigerator 74 is connected to thermoacoustic engine 52 to be driven by the work extracted at high temperature from flue gas.

Figure 3:
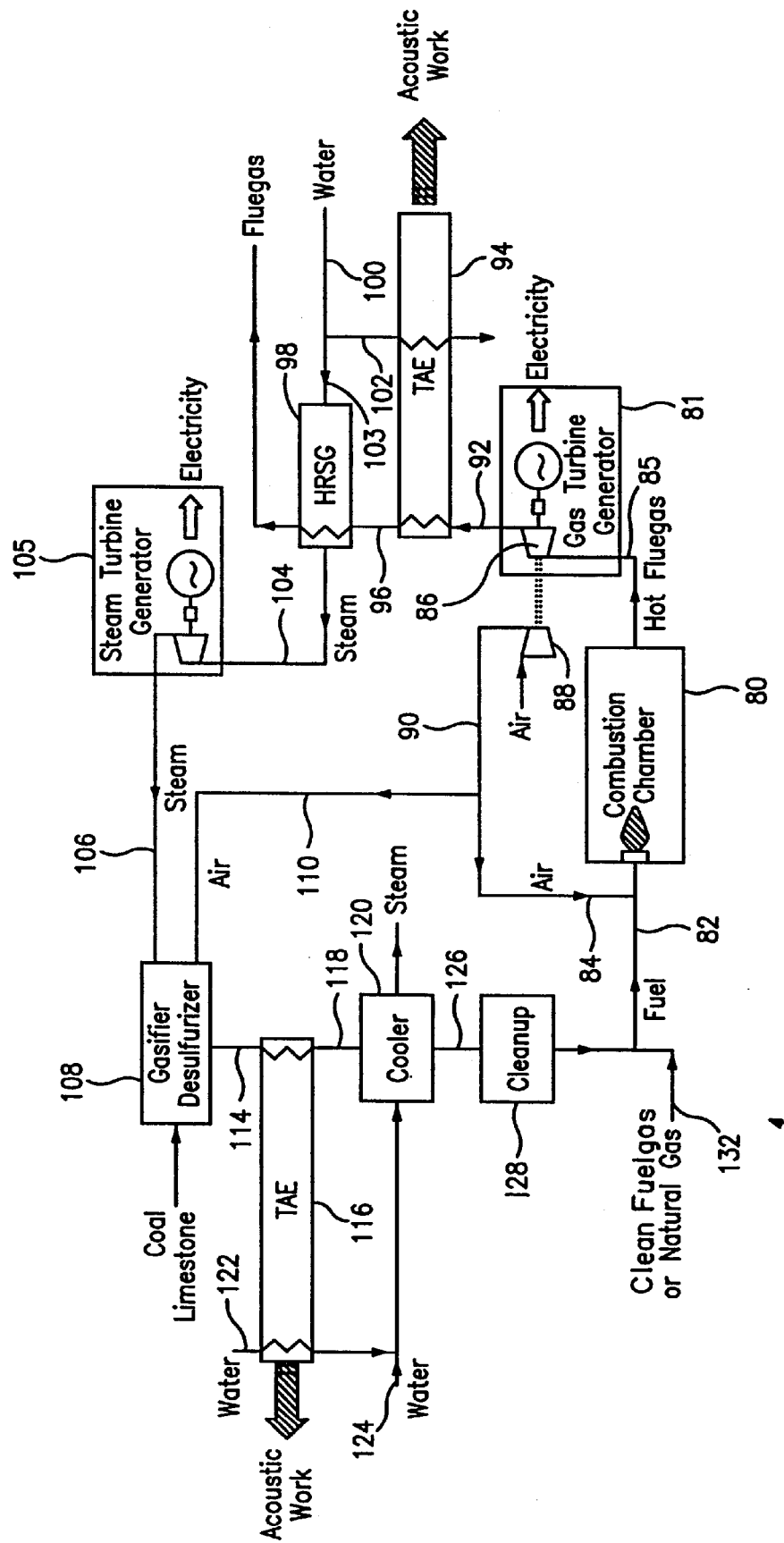
FIG. 3 is a schematic illustration of an integrated gasification combine cycle incorporating a method of the present invention.

With reference to FIG. 3, an apparatus 3 is illustrated that forms an integrated gasification combined cycle that is designed to generate electricity through the gasification of coal. In apparatus 3, the process system consists of a combustion chamber 80 coupled to a gas turbine generator 81. Fuel and air streams 82 and 84, respectively, are introduced into combustion chamber 80. The fuel is combusted to produce a hot flue gas stream 85 which is introduced into a turbine 86 of the gas turbine generator 81. Part of the shaft work of turbine 86 is transmitted to an air compressor 88 which produces a compressed air stream 90 that in part forms air stream 84 that supports combustion within combustion chamber 80. Other work is recovered from turbine 86 as electricity.

The exhaust of turbine 86 forms a hot process stream 92 that is introduced into a thermoacoustic engine 94 to generate an intermediate temperature process stream 96 that is fed into a steam generator 98. An incoming water stream 100 is divided into subsidiary water streams 102 and 103. Subsidiary water stream 102 removes heat from the cold end heat exchanger of thermoacoustic engine 94. Subsidiary water stream 103 is introduced into steam generator 98 to produce a stream 104 that is composed of steam. Stream 104 can be introduced into a steam turbine generator 105 to generate additional electricity. The exhaust of steam turbine-generator 105, as a stream 106, is introduced into a known coal gasifier-desulfurizer system 108 along with a compressed air stream 110 formed in part from compressed air stream 90. Coal and limestone 112 is also fed into coal gasifier-desulfurizer system 108.

Gasifier-desulfurizer system 108 produces an untreated fuel stream 114 that can serve as a hot process stream to a further thermoacoustic engine 116 to produce thermoacoustic work. As a result, an intermediate temperature process stream 118 is produced that is cooled within an after-cooler 120 that produces steam from incoming water streams 122 and 124. Incoming water stream 122 serves as a cooling fluid for the cold end heat exchanger of further thermoacoustic engine 116. The resultant cooled stream 126 is then introduced into a known clean up unit 128 to produce a purified flue stream 130 that can be combined with a natural gas stream 132 to produce fuel stream 82 that is burned within combustion chamber 80 of the gas turbine.

Figure 4:
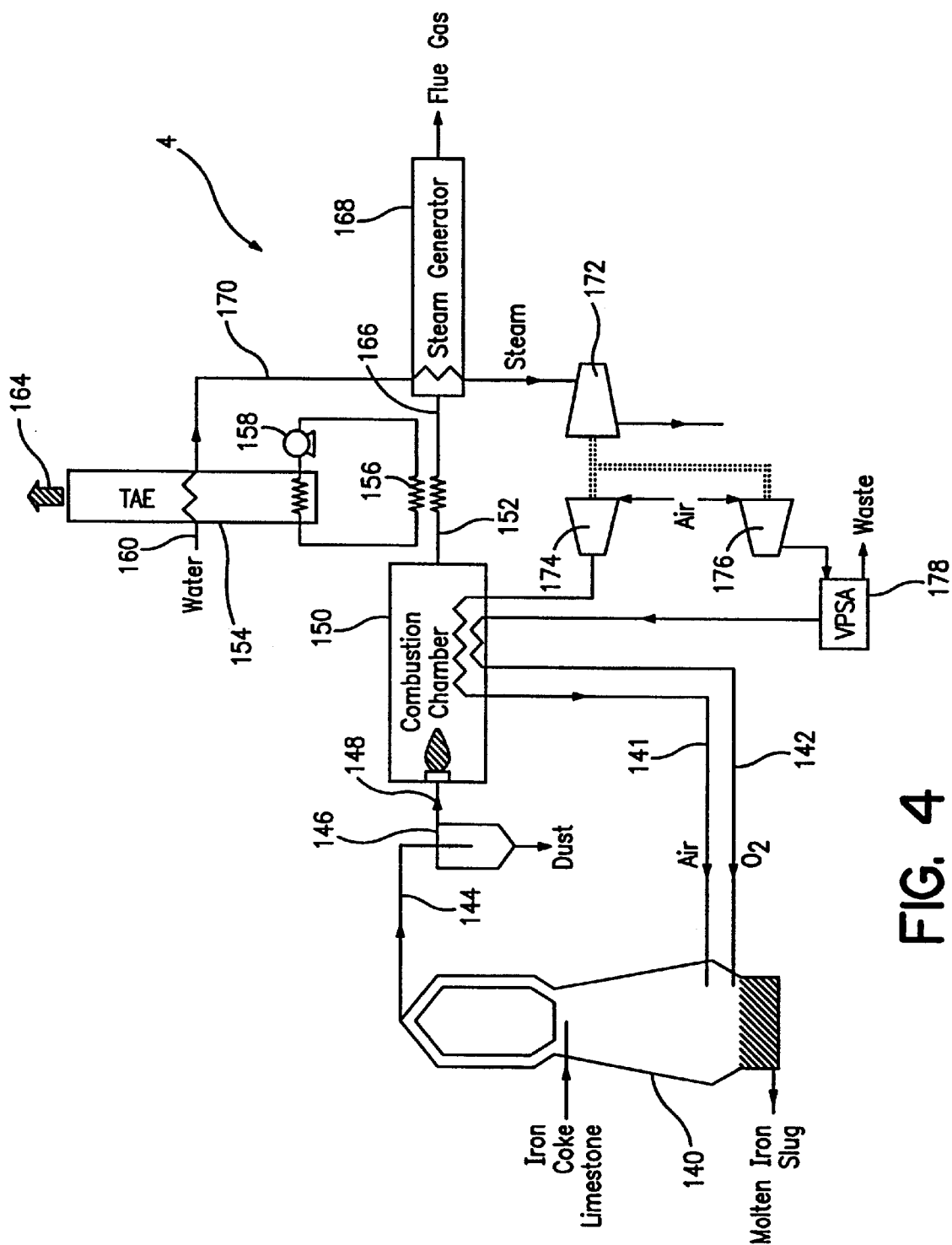
FIG. 4 is a glass furnace incorporating a method in accordance with the present invention.

With reference to FIG. 4, an apparatus 4 is illustrated that utilizes the present invention in connection with a blast furnace 140. In accordance with this application of the present invention, the blast furnace is charged with iron, coke and limestone. Heated air and oxygen streams 141 and 142 are introduced to the base of the furnace to combust coke and to produce a reducing gas containing carbon monoxide, hydrogen and carbon dioxide. As the reducing gas rises in blast furnace 140, iron oxides are reduced to iron and at the top of the furnace, the remaining gas is exothermically reacted to melt the iron fed to the top of the blast furnace 140. The resultant flue gas which still contains a significant amount of combustible hydrogen and carbon monoxide is expelled from the top of blast furnace 140 as a gas stream 144. Molten iron and slag are extracted from the bottom of blast furnace 140.

After separation of dust within a separating unit 146, a flue gas stream 148 is produced that is combusted within a combustion chamber 150 to heat the incoming air and oxygen streams 141 and 142, respectively, and to produce a hot process stream 152.

Heat is transferred from hot process stream 152 to a thermoacoustic engine 154 by way of the heat transfer loop having a heat exchanger 156 and a pump 158 to pump a heat transfer fluid, made up of helium or other gases/liquids, through the hot end heat exchanger of a thermoacoustic engine 154. Instead of the heat transfer loop, heat pipes could be used to transfer heat to the thermoacoustic engine. A water stream 160 is introduced into the cold end heat exchanger of thermoacoustic engine 154 in order to provide the necessary cooling of the stack contained therewithin. Thermoacoustic work generally indicated by arrowhead 164 can be extracted and applied to the generation of electricity, refrigeration, or other necessary processes.

The resultant intermediate temperature process stream 166 is then introduced into a steam generator 168 to generate steam from a water stream 170 made up of water stream 160 after having been heated. The resultant steam is introduced into a steam turbine 172. Steam turbine 172 produces shaft work that is applied to a compressor having stages 174 and 176. Stage 176 compresses air for use in anyone of a number of known vacuum pressure swing adsorption processes, designated by reference number 178, to produce oxygen stream 142. Stage 174 compresses air to produce compressed air stream 141.

Figure 5:
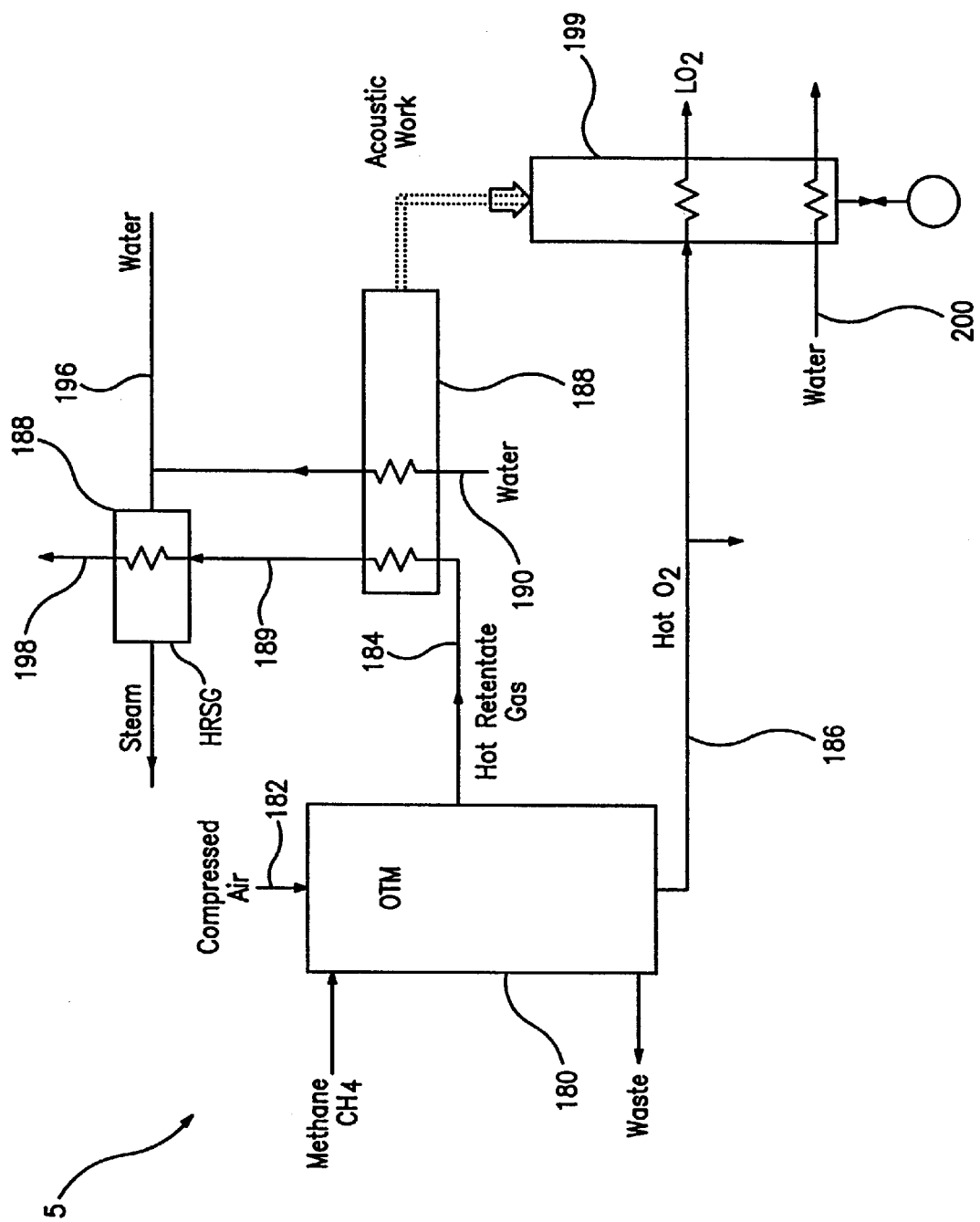
FIG. 5 is a schematic illustration of an oxygen transport membrane system incorporating a method in accordance with the present invention.

With reference to FIG. 5, an apparatus 5 is shown that illustrates an application of the present invention to an oxygen generator 5 that incorporates an oxygen transport membrane system 180. Oxygen transport membrane system 180 has one or more ceramic membranes. that function at high temperature to allow transport of oxygen ions produced by oxygen in an oxygen containing gas introduced into a cathode side of one or more oxygen transport membranes of oxygen transport membrane system 180. The oxygen ions through a pressure differential or an electric current, depending upon the type of membrane, are transported to an anode side of the membrane.

In oxygen transport membrane system 180, a pressure differential is used to effectuate the transport of oxygen ions and as such, compressed air stream 182 is introduced into oxygen transport membrane system 180. It is heated by combusting methane in the presence of some of the oxygen contained in compressed air stream 182. Oxygen separates from the air to produce a hot process stream 184 which is composed of residual components of compressed air stream 182 after separation of the oxygen. An oxygen product stream 186 is extracted from the oxygen transport membrane system. 180. Hot process stream 184 is introduced to a thermoacoustic engine 188 along with water stream 190. Hot process stream 184 cools to produce an intermediate process stream 189 that is introduced into a steam generator 188. Water contained within stream 190 and water stream 196 are introduced into a steam generator 197 to produce a stream 198 containing steam. The work of thermoacoustic engine 188 is applied to an acoustic refrigerator such as a pulse tube refrigerator 199 which is used to liquefy an oxygen product stream 186. Water stream 200 is introduced into the cold heat exchanger in contact with regenerator material contained within an orifice pulse tube refrigerator 199.

Figure 6:
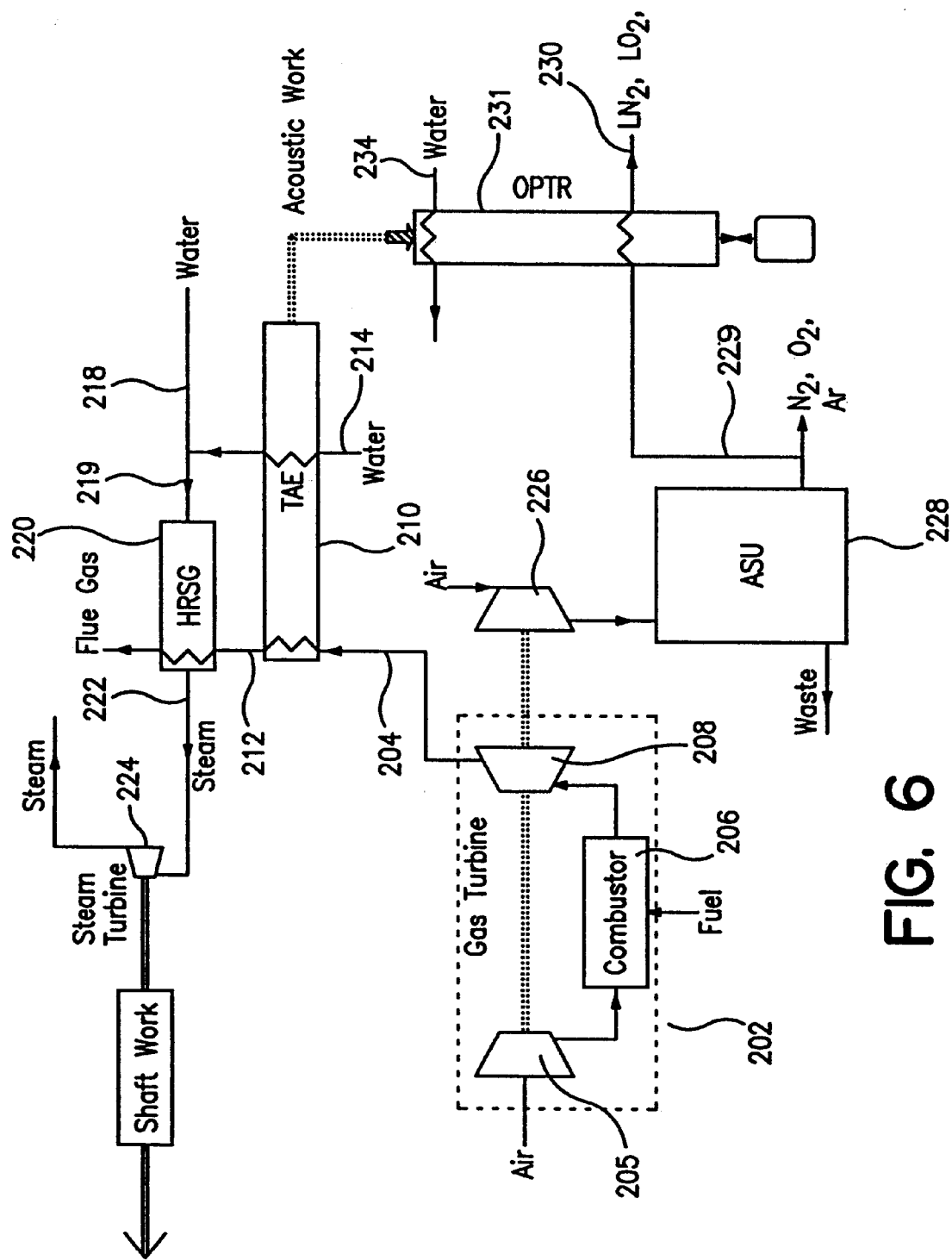
FIG. 6 is a schematic illustration of a system combining an air separation unit and a gas turbine incorporating a method in accordance with the present invention.

FIG. 6 illustrates an application of the present invention to an air separation unit. In accordance with this embodiment of the present invention, a gas turbine 202 produces a hot process stream 204 as an exhaust. Gas turbine unit 202 is provided with an air compressor 205 and a combustor 206 to combust the fuel in the presence of oxygen contained in air to heat the air and introduce it into turbine 208. Hot process stream 204 is introduced into a thermoacoustic engine 210 to produce an intermediate process stream 212. Water stream 214 is introduced to thermoacoustic engine 210 for use within the cold end heat exchanger thereof and is then combined with a water stream 218. The streams 214 and 218, after combination, produce a combined stream that is introduced into steam generator 220 to raise steam as a stream 222 that can be introduced to a steam turbine 224. The shaft work of steam turbine 224 can be used to generate electricity or for other purposes.

An air compressor 226 is coupled to gas turbine 202 to compress air and introduce it to an air separation unit 228. While not illustrated, air separation unit 228 has one or more distillation columns that function to separate nitrogen and oxygen to produce one or more product streams that can be either enriched in nitrogen or oxygen. Such a product stream, designated by reference numeral 229 is introduced into an acoustic refrigerator such as pulse tube refrigerator 231 to be liquefied and thereby to produce a liquid product stream 232. Work output of thermoacoustic engine 220 drives pulse tube refrigerator 230 which contains a cold end heat exchanger cooled by a stream 234.

Figure 7:
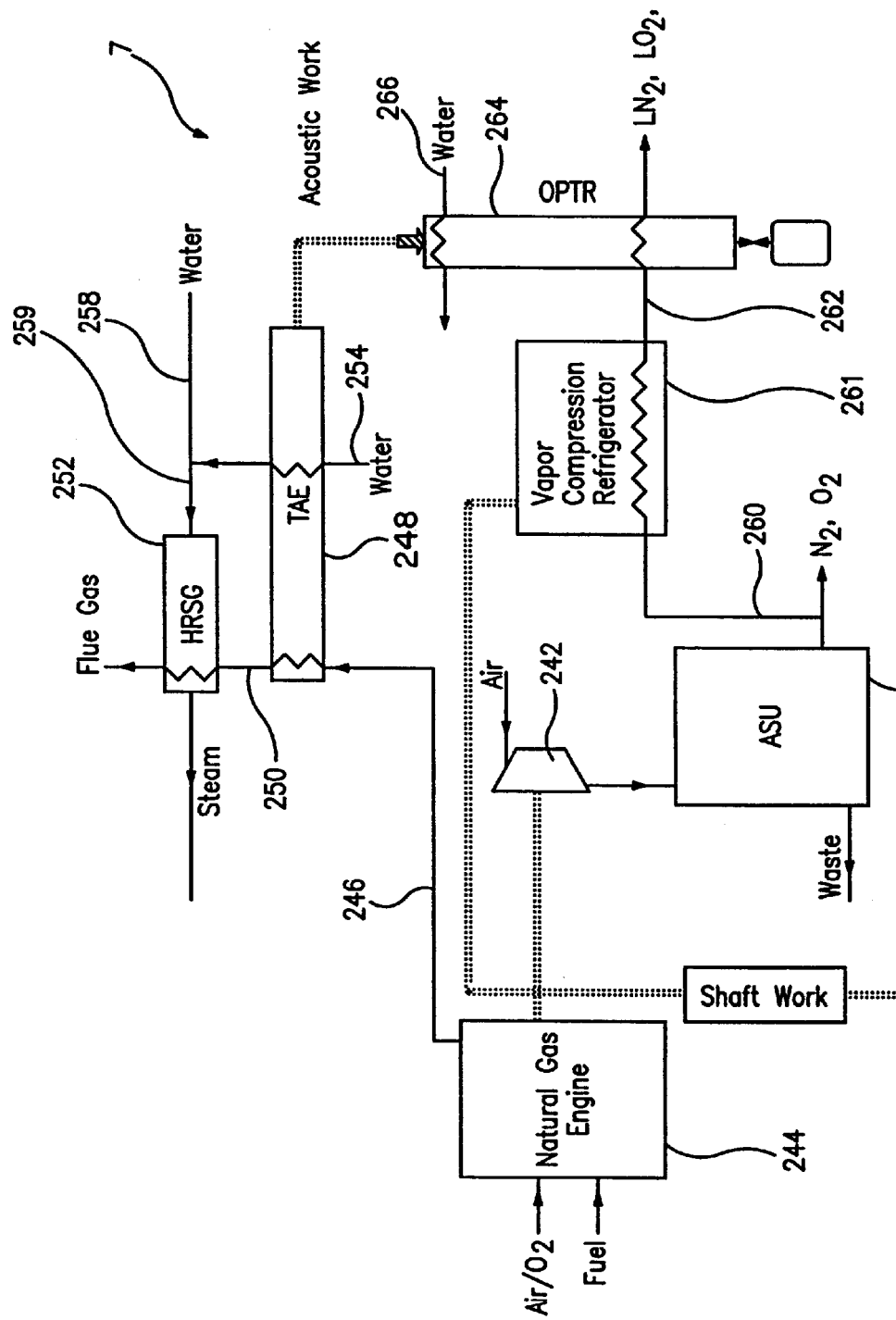
FIG. 7 is a system utilizing an air separation unit and a natural gas engine incorporating a method in accordance with the present invention.

FIG. 7 illustrates an application of the present invention to an apparatus 7 which utilizes an air separation unit 240 having a compressor 242 powered by a natural gas engine 244. Natural gas engine 244 combusts fuel in the presence of oxygen or oxygen enriched air to produce an exhaust that functions as a hot process stream 246 that is introduced into a thermoacoustic engine 248 to produce an intermediate temperature process stream 250. Intermediate temperature process stream 250 heats water within a steam generator 252 to raise steam. Thermoacoustic engine 248 is cooled by water introduced as a stream 254 which is combined with a stream 258. The resultant combined stream 259 is introduced into steam generator 252.

Natural gas engine 244, as stated previously, powers compressor 242 which compresses air to be separated in an air separation unit 240. Air separation unit 240 produces a stream 260 either enriched in nitrogen or oxygen is introduced into a vapor compression refrigerator 261 that is also powered by natural gas engine 244. As illustrated, some of the shaft work can be used for other purposes. The resultant product stream 262 is then introduced into an orifice pulse tube refrigerator 264 which is powered by thermoacoustic engine 248 to liquefy product stream 262. A water stream 266 is introduced into the aftercooler of pulse tube refrigerator 264.

While the present invention has been described with reference to preferred embodiments, as will occur to those skilled in the art, numerous changes, additions and omissions can be made without departing from the spirit and scope of the present invention.

We claim:

1. A method of conducting a process involving the generation of steam, said process comprising:

generating a hot process stream;

A transferring heat from said hot process stream to a thermoacoustic engine to recovery energy from said hot process stream as thermoacoustic work and to generate an intermediate temperature process steam; and introducing said intermediate temperature process stream into a steam generator to generate said steam through indirect heat exchange with water.

2. The method of claim 1, wherein said hot process stream is generated by burning a fuel in the presence of an oxidant.

3. The method of claim 1, wherein further energy is recovered by introducing said steam into a steam turbine.

4. The method of claim 2, wherein:

said steam is combined with a methane containing feed subjected to steam methane reforming, thereby to produce a hydrogen containing gas; and said hydrogen is separated from said hydrogen containing gas to produce a hydrogen product stream and part of said fuel.

5. The method of claim 4, wherein said hydrogen product stream is liquefied in a acoustic refrigerator driven by said thermoacoustic engine.

6. The method of claim 2, further comprising:

recovering further energy from said hot process stream within a turbine prior to the transfer of heat from said hot process stream to said thermoacoustic engine; and introducing said steam into a coal gasifier to generate part of said fuel.

7. The method of claim 6 wherein:

said further energy is applied to power an air compressor to produce a compressed air stream; and said compressed air stream at least in part forms said oxidant.

8. The method of claim 7, wherein:

said coal gasifier produces an untreated fuel stream;

part of said compressed air stream forms said oxidant;

said untreated fuel stream is passed in sequence into a further thermoacoustic engine, thereby to produce further thermoacoustic work, an exhaust gas cooling unit, and a cleanup unit to produce said part of said fuel; and said further thermoacoustic work is extracted from said further thermoacoustic engine.

9. The method of claim 1, wherein heat is transferred from said hot process stream to said thermoacoustic engine by a heat transfer fluid heated through indirect heat exchange with said hot process stream produced as a flue gas within a furnace.

10. The method of claim 9, wherein:

said furnace is a blast furnace;

said steam drives a steam turbine, thereby to produce shaft work;

said shaft work is applied to two air compressors to compress air;

one of said two air compressors is coupled to a vacuum pressure swing adsorption unit to produce an oxygen stream and the other of the two air compressors produces a compressed air stream;

said compressed air stream and said oxygen stream are heated within said blast furnace; and said compressed air stream and said oxygen stream, after having been heated, are introduced into said blast furnace to support combustion of coke and thereby to produce a reduce gas.

11. The method of claim 1, wherein:

an oxygen containing gas is passed into an oxygen transport membrane reactor, thereby to produce a heated retentate stream and an oxygen product stream; and said hot process stream is formed at least in part from said heated retentate stream.

12. The method of claim 11, wherein said oxygen product stream is liquefied within an acoustic refrigerator driven by said thermoacoustic engine.

13. The method of claim 1, wherein:

said hot process stream is produced from an exhaust of a gas turbine;

shaft work produced by said gas turbine is applied to compress air in a cryogenic air separation unit;

said cryogenic air separation unit produces at least one product stream predominantly composed of oxygen or nitrogen; and said at least one product stream is liquefied within a acoustic refrigerator driven by said thermoacoustic engine.

14. The method of claim 13 wherein said steam is introduced into a steam turbine to produce further shaft work.

15. The method of claim 2, wherein:

said fuel and oxidant are burned within a natural gas engine generating shaft work;

part of the shaft work is used to drive an air compressor to compress air in a cryogenic air separation unit;

said cryogenic air separation unit produces a product stream enriched in one of oxygen and nitrogen; and said product stream is introduced into a vapor compression refrigerator driven by a further part of said shaft work and then into an acoustic refrigerator driven by said acoustic work produced in said thermoacoustic engine.

* * * * *